US009429709B2

(12) United States Patent
He

(10) Patent No.: US 9,429,709 B2
(45) Date of Patent: Aug. 30, 2016

(54) STACK OF LIGHT GUIDE PLATES AND METHOD FOR PROCESSING THE SAME

(71) Applicant: Shenzhen China Star Optoelectronics Technology Co., Ltd., Shenzhen, Guangdong (CN)

(72) Inventor: Hu He, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 94 days.

(21) Appl. No.: 14/396,047

(22) PCT Filed: Sep. 11, 2014

(86) PCT No.: PCT/CN2014/086296
§ 371 (c)(1),
(2) Date: Oct. 21, 2014

(87) PCT Pub. No.: WO2016/026186
PCT Pub. Date: Feb. 25, 2016

(65) Prior Publication Data
US 2016/0054524 A1     Feb. 25, 2016

(30) Foreign Application Priority Data
Aug. 20, 2014    (CN) .......................... 2014 1 0415355

(51) Int. Cl.
*G02B 6/10*     (2006.01)
*G02B 6/26*     (2006.01)

(52) U.S. Cl.
CPC .. *G02B 6/26* (2013.01); *G02B 6/10* (2013.01)

(58) Field of Classification Search
CPC ................. G02B 6/0028; G02B 2006/12195; G02B 6/1228; G02B 6/26; G02B 6/10

USPC ............... 385/43, 14, 131, 132, 129; 451/54
See application file for complete search history.

(56) References Cited

U.S. PATENT DOCUMENTS

| 7,545,429 B2* | 6/2009 | Travis | G02B 5/045 348/335 |
| 7,660,047 B1* | 2/2010 | Travis | G06F 3/042 359/726 |
| 2013/0315536 A1* | 11/2013 | Huang | G02B 6/26 385/43 |
| 2015/0338660 A1* | 11/2015 | Mukawa | G02B 5/30 359/13 |

FOREIGN PATENT DOCUMENTS

| JP | 08240721 A | * | 9/1996 | |
| JP | 2008257253 A | * | 10/2008 | |
| WO | WO 0138910 A1 | * | 5/2001 | ........... G02B 6/1228 |

\* cited by examiner

*Primary Examiner* — Ellen Kim
(74) *Attorney, Agent, or Firm* — Andrew C. Cheng

(57) ABSTRACT

A stack of light guide plates is proposed. Each light guide plate includes a light guide plate body and an incident side, thickness of the incident side is more than thickness of the light guide plate body, two light guide plates are reversely arranged and laminated when the two light guide plates are processed, and then a plurality of a pair of laminated light guide plates are stacked. The present embodiment provides a method for processing light guide plates. Even though the thickness of the incident side or the wedged shape of the incident side changes, the method can be adopted. The stack of light guide plates remain neat and flat using the method. Because a batch of light guide plates are cut and polished using the method, the efficiency in processing light guide plates improves. In this way, utilization of the equipment improves as well.

9 Claims, 2 Drawing Sheets

STACK OF LIGHT GUIDE PLATES AND METHOD FOR PROCESSING THE SAME

BACKGROUND OF THE INVENTION

1. Field of the Invention

The present invention relates to the processing domain related to light guide plates, and more particularly, to a stack of light guide plates undergoing cut and polished.

2. Description of the Prior Art

Light guide plates are a kind of high tech plate having qualities of extreme high reflectivity and irrelevant to light-absorbing. light guide plates have two types—flat light guide plates and light guide plates—based on the shape of light guide plates. For a light guide plate comprising the thickness of an incident side more than the thickness of the body itself, it has a simple structure and it is easy to be produced when being cut and polished in process. But, only one light guide plate is allowed to be processed each time. It means that processing this kind of light guide plate is not efficient, and resources may be wasted during the operation of the machine. So, it is necessary to create a new method for processing a batch of light guide plates.

SUMMARY OF THE INVENTION

An object of the present is to provide a stack of processing light guide plates for solving the problem occurring in the conventional technology.

According to the present invention, a stack of light guide plates is provided. Each light guide plate comprises a light guide plate body and an incident side, thickness T1 of the incident side is more than thickness T2 of the light guide plate body, two light guide plates are reversely arranged and laminated when the two light guide plates are processed, and then a plurality of a pair of laminated light guide plates are stacked.

Furthermore, the light guide plate comprises at least an incident surface, a light emitting surface, and a bottom, the light emitting surfaces of the two light guide plates are disposed face to face, and a terminal of the incident side of the one light guide plate is not taller than a plane where the bottom of the other light guide plate is situated.

Furthermore, the incident side of the light guide plate is wedge-shaped and comprises a slope, and the slope is connected to the middle of the incident surface and the light emitting surface.

Furthermore, the middle of the slope of the incident surface and the incident surface comprises a second plane, and the second plate and the bottom are in parallel.

Furthermore, the thickness T1 of the incident side is less than and equal to double the thickness T2 of the light guide plate body, and the light emitting surfaces of the two light guide plates are attached to each other when the two light guide plates are laminated.

Furthermore, the thickness T1 of the incident side is more than double the thickness T2 of the light guide plate body, a top of the incident side of the one light guide plate over the light emitting surface of the one light guide plate itself is connected to the light emitting surface of the other light guide plate, the middle between the laminated light guide plate bodies comprises a gap, and the gap comprises a base plate.

Furthermore, the thickness T3 of the base plate is no less than a sum of the thickness T1 of the incident side and the thickness T2 of the light guide plate body.

Furthermore, the incident side is a slope, the slopes of every two light guide plates are connected and laminated, and a baffle plate is disposed on one side of a plurality of a pair of laminated light guide plates.

According to the present invention, a method for processing a light guide plate to be cut and polished is provided. A stack of neatly laminated light guide plates are cut and polished.

The function of the stack of processing light guide plates provided by the present convention is as follows:

Even though the thickness of an incident side of a stack of the stack of light guide plates changes, or the shape of a superposition of an incident side varies, the stack of the stack of light guide plates can be adopted. The present convention ensures that the laminated light guide plates remain neat and flat and makes it possible that a batch of light guide plates are cut and polished. The present stack of the stack of light guide plates comprises a simple structure, which is make it easy to operate and applied widely.

DETAILED DESCRIPTION OF THE PREFERRED EMBODIMENTS

Compared with the conventional technology with some faults, the present invention provides a superposition of a stack of light guide plates whenever a batch of light guide plates are cut and polished. An light guide plate composes a light guide plate body and an incident side. The thickness of the incident side is more than the thickness of the light guide plate body. Any two light guide plates are reversely arranged and exit light surfaces of the light guide plates are laminated face to face when the light guide plates are processed. A terminal of the incident side of the one light guide plate is not taller than a plane where a bottom of the other light guide plate is situated. Then, a plurality of a pair of light guide plates are laminated. Even though the thickness of the incident side changes or the shape of the incident side varies, the stack of the stack of light guide plates can be adopted. It ensures that the laminated light guide plates remain neat and flat.

The present invention is described in detail in conjunction with the accompanying drawings and embodiments.

Embodiment 1

Figure 1:
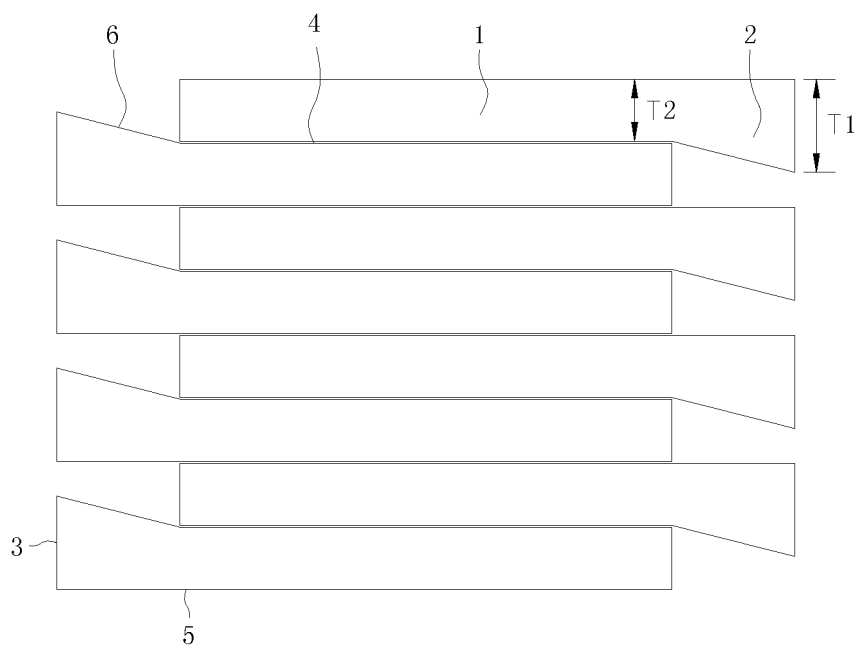
FIG. 1 is a schematic diagram showing a stack of light guide plates according to a first embodiment of the present invention.

FIG. 1 is a schematic diagram showing a stack of light guide plates according to a first embodiment of the present invention. A light guide plate is formed by a light guide plate body 1 and an incident side 2. The light guide plate body 1 is of uniform thickness throughout. The incident side 2 is integrally formed and wedge-shaped. As FIG. 1 shows, the light guide plate comprises a plurality of lateral sides comprising an incident surface 3, a slope 6 of the incident side 2, and a light emitting surface 4. The slope 6 of the incident side 2 and the light emitting surface 4 are connected to one side of the incident surface 3 in order. The other side of the incident surface 3 is connected to a bottom 5. The bottom 5 is opposite to the light emitting surface 4. The thickness T1 of the incident side 2 is less than double the thickness T2 of the light guide plate body 1 while is more than the thickness T2 of the light guide plate body 1. Every two light guide plates are laminated when undergoing processing, and the light emitting surfaces 4 of the light guide plates are overlapped as well. In this way, the incident side 2 of the one of the light guide plates is located at one side of the other light guide plate. Besides, the top of the one light guide plate over the light emitting surface 4 of the light guide plate itself does not go beyond the bottom 5 of the other light guide plate.

The present embodiment provides a method for processing light guide plates. It is possible to form a stack of light guide plates after light guide plates are overlapped one by one. Even though the thickness of the incident side 2 or the wedged shape of the incident side 2 changes, the method can be adopted. The stack of light guide plates remain neat and flat using the method. Because a batch of light guide plates are cut and polished using the method, the efficiency in processing light guide plates improves. In this way, utilization of the equipment improves as well.

Embodiment 2

Figure 2:
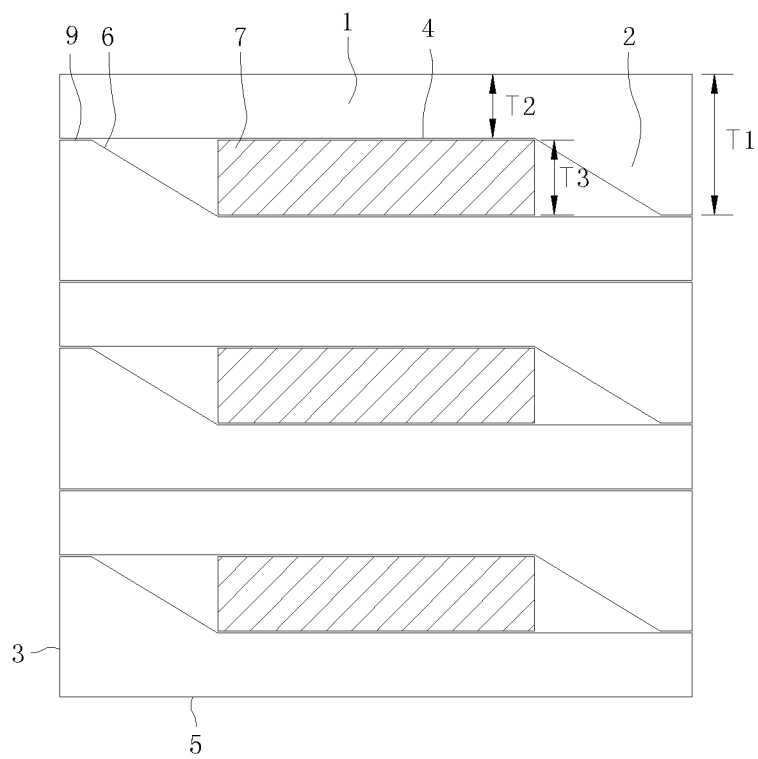
FIG. 2 is a schematic diagram showing a stack of light guide plates according to a second embodiment of the present invention.

FIG. 2 is a schematic diagram showing a stack of light guide plates according to a second embodiment of the present invention. As FIG. 2 shows, the thickness T1 of an incident side 2 is more than double the thickness T2 of a light guide plate body 1. If two light guide plates are laminated like what is done in the first embodiment, the incident side 2 of the one of the light guide plates is surely higher a bottom 5 of the other light guide plate. It is not beneficial for processing the stack of light guide plates. The light guide plate according to this embodiment also comprises a plane 9 between a slope 6 of the incident side 2 and an incident surface 3. The plane 9 and the bottom 5 are in parallel. The plane 9 of the incident side 2 of the one of the light guide plates is attached to a light emitting surface 4 of the other light guide plate when the two light guide plates are laminated. The middle of the two laminated light guide plates comprises a gap. The light guide plate in this embodiment comprises a base plate 7 in the gap.

The thickness T3 of the base plate 7 is the difference between the thickness T1 of the incident side 2 and the thickness T2 of the light guide plate body 1. In this way, the light guide plates can maintain balanced when the light guide plates are laminated. Also, the stack of the light guide plates can be processed successfully.

Embodiment 3

Figure 3:
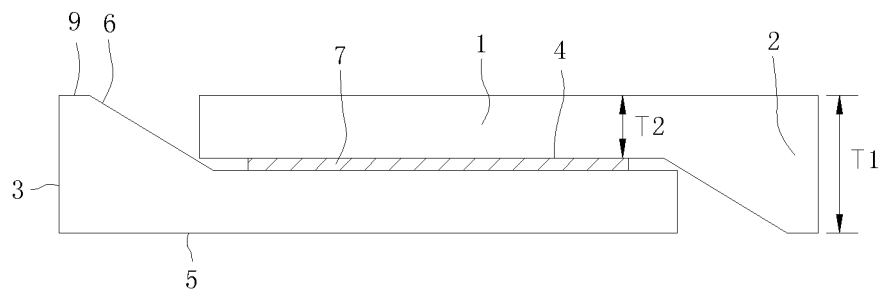
FIG. 3 is a schematic diagram showing a stack of light guide plates according to a third embodiment of the present invention.

Compared with the second embodiment, a third embodiment shows that two light guide plates are laminated as what is done in the first embodiment, as shown in FIG. 3. An incident side 2 of the one of the light guide plates is located at one side of the other light guide plate. The top of the one light guide plate over a light emitting surface 4 of the light guide plate itself is a plane 9. The plane 9 is aligned with a bottom 5 of the other light guide plate. The distance between the light emitting surface 4 of the one light guide plate and the light emitting surface 4 of the other light guide plate is smaller. A base plate 7 in the middle is made smaller. When a plurality of light guide plates are stacked, the size of the stack of the plurality of light guide plates is effectively smaller. In the third embodiment, the thickness T3 of the base plate 7 is more than the sum of the thickness T1 of the incident side 2 and the thickness T2 of a light guide plate body 1. In this way, a gap surely exists between the two light guide plates. Owing to the gap, the one light guide plate does not rub the other light guide plate when the light guide plates are processed.

Embodiment 4

Figure 4:
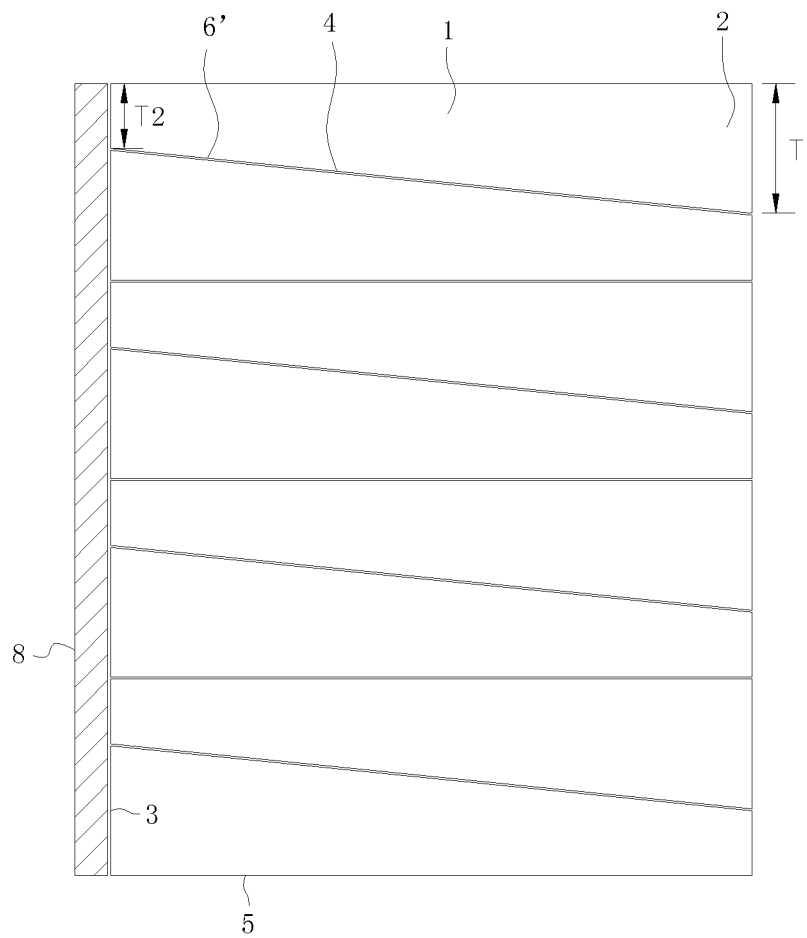
FIG. 4 is a schematic diagram showing a stack of light guide plates according to a fourth embodiment of the present invention.

FIG. 4 is a schematic diagram showing a stack of light guide plates according to a fourth embodiment of the present invention. A light emitting surface 4 is a slope 6'. An incident side 2 naturally transits to a light guide plate body 1 because of the slope 6'. The incident side 2 and the light guide plate body 1 are wedge-shaped. The slopes 6' of every two light guide plates are connected and laminated. A baffle plate 8 is disposed on one side of a plurality of the pair of laminated light guide plates. The baffle plate 8 is used for preventing the light guide plates from sliding because of the slope 6' when the light guide plates are processed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An arrangement of stack of light guide plates to be cut or processed, where each light guide plate comprises a light guide plate body and an incident side, thickness T1 of the incident side is more than thickness T2 of the light guide plate body, two light guide plates are reversely arranged and laminated when the two light guide plates are processed, and then a plurality of a pair of laminated light guide plates are stacked;

wherein the thickness T1 of the incident side is more than double the thickness T2 of the light guide plate body, a top of the incident side of the one light guide plate over a light emitting surface of the one light guide plate itself is connected to the light emitting surface of the other light guide plate, the middle between the laminated light guide plate bodies comprises a gap, and the gap comprises a base plate so as to improve efficiency in processing and utilization of equipment.

2. The arrangement of stack of light guide plates to be cut or processed as claimed in claim 1, wherein the light guide plate comprises at least an incident surface, the light emitting surface, and a bottom, the light emitting surfaces of the two light guide plates are disposed face to face.

3. The arrangement of stack of light guide plates to be cut or processed as claimed in claim 2, wherein the incident side of the light guide plate is wedge-shaped and comprises a slope, and the slope is connected to the middle of the incident surface and the light emitting surface.

4. The arrangement of stack of light guide plates to be cut or processed as claimed in claim 3, wherein the middle of the slope of the incident surface and the incident surface comprises a second plane, and the second plate and the bottom are in parallel.

5. An arrangement of stack of light guide plates to be cut or processed, where each light guide plate comprises a light guide plate body and an incident side, thickness T1 of the incident side is more than thickness T2 of the light guide plate body, two light guide plates are reversely arranged and laminated when the two light guide plates are processed, and then a plurality of a pair of laminated light guide plates are stacked;

wherein the thickness $T1$ of the incident side is more than double the thickness $T2$ of the light guide plate body, a top of the incident side of the one light guide plate over a light emitting surface of the one light guide plate itself is aligned with a bottom of the other light guide plate, the middle between the laminated light guide plate bodies comprises a gap, and the gap comprises a base plate so as to improve efficiency in processing and utilization of equipment.

6. The arrangement of stack of light guide plates to be cut or processed as claimed in claim 5, wherein the light guide plate comprises at least an incident surface, the light emitting surface, and the bottom, the light emitting surfaces of the two light guide plates are disposed face to face.

7. The arrangement of stack of light guide plates to be cut or processed as claimed in claim 6, wherein the incident side of the light guide plate is wedge-shaped and comprises a slope, and the slope is connected to the middle of the incident surface and the light emitting surface.

8. The arrangement of stack of light guide plates to be cut or processed as claimed in claim 7, wherein the middle of the slope of the incident surface and the incident surface comprises a second plane, and the second plate and the bottom are in parallel.

9. The arrangement of stack of light guide plates to be cut or processed as claimed in claim 5, wherein a thickness $T3$ of the base plate is no less than a sum of the thickness $T1$ of the incident side and the thickness $T2$ of the light guide plate body.

* * * * *